(12) United States Patent
Oruganti et al.

(10) Patent No.: US 11,874,121 B2
(45) Date of Patent: Jan. 16, 2024

(54) METHOD AND SYSTEM FOR FLEET ROUTE OPTIMIZATION

(71) Applicant: Tata Consultancy Services Limited, Mumbai (IN)

(72) Inventors: Venkateswar Panduranga Oruganti, Hyderabad (IN); Sreedhar Aitipamula, Hyderabad (IN); Choudhary Beni Madhav Mishra, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 116 days.

(21) Appl. No.: 17/574,248

(22) Filed: Jan. 12, 2022

(65) Prior Publication Data
US 2022/0221285 A1 Jul. 14, 2022

(30) Foreign Application Priority Data
Jan. 13, 2021 (IN) .............................. 202121001671

(51) Int. Cl.
G01C 21/34 (2006.01)
G01C 21/20 (2006.01)
G06Q 50/30 (2012.01)

(52) U.S. Cl.
CPC ......... G01C 21/3415 (2013.01); G01C 21/20 (2013.01); G06Q 50/30 (2013.01)

(58) Field of Classification Search
CPC .... G01C 21/3415; G01C 21/20; G06Q 50/30; G06Q 10/08355
See application file for complete search history.

(56) References Cited

U.S. PATENT DOCUMENTS

2012/0310691 A1 * 12/2012 Carlsson .............. G06Q 10/047
705/7.13

FOREIGN PATENT DOCUMENTS

CN 109800904 A 5/2019

OTHER PUBLICATIONS

Ho et al.; Maximizing paper spread in examination timetabling using a vehicle routing method; Proceedings 13th IEEE International Conference on Tools with Artificial Intelligence. ICTAI 2001 (pp. 359-366) (Year: 2001).*

(Continued)

*Primary Examiner* — Peter D Nolan
*Assistant Examiner* — Roy Rhee
(74) *Attorney, Agent, or Firm* — Finnegan, Henderson, Farabow, Garrett & Dunner, LLP (57) ABSTRACT

This disclosure relates generally to fleet route optimization. Conventional methods for fleet route optimization have limited capability in managing and controlling transport of material from geographically spread out suppliers to the door-step of the customer in an efficient manner in real-time. The disclosed method includes optimization at two levels. At the first level and initial optimized route is obtained for the fleet by clustering the target locations into multiple clusters and obtaining heuristic on each cluster by using a weightage matrix. The initial set of optimized routes are examined in real time, and based on said examination, the routes are optimized (second level optimization) to provide a final set of optimized routes. The disclosed method and system thus facilitate in creating routes dynamically, monitor it through the application, and dynamically change and/or alter the routes based on new order and/or execution challenges.

11 Claims, 8 Drawing Sheets

(56) References Cited

OTHER PUBLICATIONS

Zunic et al.; Cluster-based approach for successful solving real-world vehicle routing problems; Proceedings of the Federated Conference on Computer Science and Information Systems pp. 619-626 DOI: 10.15439/2020F184 ISSN 2300-5963 ACSIS, vol. 21 (Year: 2020).*

Tam, Vincent W.L. et al., "An Effective Search Framework Combining Meta-Heuristics to Solve the Vehicle Routing Problems with Time Windows", Vehicle Routing Problem, Date: Sep. 2008, Publisher: Semantic Scholar, https://www.researchgate.net/publication/221787182_An_Effective_Search_Framework_Combining_Meta-Heuristics_to_Solve_the_Vehicle_Routing_Problems_with_Time_Windows/link/00b49522d1ef768e36000000/download.

Kissani, Iiham, Dr., "Vehicle Routing Optimization Using Time Window Constraint", Vehicle Routing Problem, Date: 2017, Publisher: Aui, http://www.aui.ma/sse-capstone-repository/pdf/spring-2017/Vehicle%20Routing%20Optimization%20with%20a%20Time%20Window%20Constraint.pdf.

Thangiah, Sam R. et al., "Hybrid Genetic Algorithm, Simulated Annealing and Tabu Search Methods for Vehicle Routing Problems with Time Windows", Vehicle Routing Problem, Date: Mar. 2014, Publisher: Research Gate, https://www.researchgate.net/publication/255676489_Hybrid_Genetic_Algorithm_Simulated_Annealing_and_Tabu_Search_Methods_for_Vehicle_Rounting_Problems_with_Time_Windows/link/56729e0b08ae54b5e462be58/download.

Nagar, Ravi et al., "Delivery Vehicle's Simultaneous Delivery and Pickup Routing Problem in an E-commerce Environment", iCreate, Date: Apr. 2018, Publisher: IJREAM, http://www.ijream.org/papers/IJREAM_SP180105.pdf.

* cited by examiner

ADDING A TARGET LOCATION 'K' TO EXISTING ROUTE

CREATING A ROUTE WITH NEW TARGET LOCATION 'K'

WD = MAX(Wwk+Wkw)-MIN(WC-W1, WC-W2, WC-W3)

METHOD AND SYSTEM FOR FLEET ROUTE OPTIMIZATION

PRIORITY CLAIM

This U.S. patent application claims priority under 35 U.S.C. § 119 to: Indian Patent Application No. 202121001671, filed on 13 Jan. 2021. The entire contents of the aforementioned application are incorporated herein by reference.

TECHNICAL FIELD

The disclosure herein generally relates to fleet management, and, more particularly, to system and method for fleet route optimization.

BACKGROUND

Logistic distribution of goods is an important aspect of fleet/vehicle routing problem since it requires optimization of routes of delivery vehicles including trucks, cargo lorries, public transportation, and so on by improving order of visit at target locations. The target locations may be pickup location and/or drop locations of the goods.

Whether a retailer, shipper of goods, manufacturer, or a fleet owner; managing and controlling transport of material from geographically spread out suppliers to the door-step of the customer is one of the key challenges of the logistics and supply chain. With proliferation of telematics and sensors, there is an abundance of data collected. However, getting real-time actionable insights from data continues to be a challenge for companies. This has led to gaps in operations planning, higher cost of services (especially in the last mile), and unrealized value from technology investments

SUMMARY

Embodiments of the present disclosure present technological improvements as solutions to one or more of the above-mentioned technical problems recognized by the inventors in conventional systems. For example, in one embodiment, a method for fleet route optimization is provided. The method include splitting, via one or more hardware processors, target location data associated with a geographical area comprising a plurality of target locations into a plurality of clusters based on a distance constraint and a material constraint using a clustering technique, wherein each cluster comprises predefined number of target locations. Further the method includes computing a weightage matrix via the one or more hardware processors, wherein elements of the weightage matrix comprises relative weight between a source location and the plurality of target locations in the geographical area, wherein the elements of the weightage matrix are derived based on weight assigned to each target location as a function of distance and time between the source location and said target location, and a penalty value associated with the target location in case of delay. Furthermore, the method includes creating, via the one or more hardware processors, optimized routes for the plurality of clusters. Herein creating an optimized route from amongst the plurality of clusters for a cluster from amongst the plurality of clusters comprises obtaining a set of initial routes by creating a first route by applying, for each cluster of the plurality of constraints, a heuristic model using the weightage matrix a set of constraints associated with a set of vehicles capable of plying in the geographical area, the set of constraints comprising a set of vehicle capacity constraints, a set of location constraints associated with the source location and target location, distance constraints, and vehicle driver constraints. Further creating the optimized route comprises optimizing the set of initial routes based on a minimization of at least one of a distance constraint, a time constraint and a capacity constraint to obtain a set of final routes. Furthermore, creating an optimized route comprises obtaining a real-time data associated with the set of initial route distance and time based on the initial set of routes followed by the vehicles in real-time, the real-time data comprising the distance and the time associated with the source location and the target locations, updating the weightage matrix based on the real-time data; and optimizing the set of final route based on the updated weightage matrix to obtain the optimized route.

In another aspect, the system includes a memory storing instructions; one or more communication interfaces; and one or more hardware processors coupled to the memory via the one or more communication interfaces, wherein the one or more hardware processors are configured by the instructions to split target location data associated with a geographical area comprising a plurality of target locations into a plurality of clusters based on a distance constraint and a material constraint using a clustering technique, wherein each cluster comprises predefined number of target locations. Further, the one or more hardware processors are configured by the instructions to compute a weightage matrix, wherein elements of the weightage matrix comprises relative weight between a source location and the plurality of target locations in the geographical area, wherein the elements of the weightage matrix are derived based on weight assigned to each target location as a function of distance and time between the source location and said target location, and a penalty value associated with the target location in case of delay. Furthermore, the one or more hardware processors are configured by the instructions to create optimized routes for the plurality of clusters, wherein to create an optimized route from amongst the plurality of clusters for a cluster from amongst the plurality of clusters, the one or more hardware processors are configured by the instructions to obtain a set of initial routes by creating a first route by applying, for each cluster of the plurality of constraints, a heuristic model using the weightage matrix a set of constraints associated with a set of vehicles capable of plying in the geographical area, the set of constraints comprising a set of vehicle capacity constraints, a set of location constraints associated with the source location and target location, distance constraints, and vehicle driver constraints, optimize the set of initial routes based on a minimization of at least one of a distance constraint, a time constraint and a capacity constraint to obtain a set of final routes, obtain a real-time data associated with the set of initial route distance and time based on the initial set of routes followed by the vehicles in real-time, the real-time data comprising the distance and the time associated with the source location and the target locations, update the weightage matrix based on the real-time data, and optimize the set of final routes based on the updated weightage matrix to obtain the optimized route.

In yet another aspect, a non-transitory computer readable medium for a method for fleet route optimization is provided. The method include splitting, via one or more hardware processors, target location data associated with a geographical area comprising a plurality of target locations into a plurality of clusters based on a distance constraint and a material constraint using a clustering technique, wherein each cluster comprises predefined number of target locations. Further the method includes computing a weightage matrix via the one or more hardware processors, wherein elements of the weightage matrix comprises relative weight between a source location and the plurality of target locations in the geographical area, wherein the elements of the weightage matrix are derived based on weight assigned to each target location as a function of distance and time between the source location and said target location, and a penalty value associated with the target location in case of delay. Furthermore, the method includes creating, via the one or more hardware processors, optimized routes for the plurality of clusters. Herein creating an optimized route from amongst the plurality of clusters for a cluster from amongst the plurality of clusters comprises obtaining a set of initial routes by creating a first route by applying, for each cluster of the plurality of constraints, a heuristic model using the weightage matrix a set of constraints associated with a set of vehicles capable of plying in the geographical area, the set of constraints comprising a set of vehicle capacity constraints, a set of location constraints associated with the source location and target location, distance constraints, and vehicle driver constraints. Further creating the optimized route comprises optimizing the set of initial routes based on a minimization of at least one of a distance constraint, a time constraint and a capacity constraint to obtain a set of final routes. Furthermore, creating an optimized route comprises obtaining a real-time data associated with the set of initial route distance and time based on the initial set of routes followed by the vehicles in real-time, the real-time data comprising the distance and the time associated with the source location and the target locations, updating the weightage matrix based on the real-time data; and optimizing the set of final route based on the updated weightage matrix to obtain the optimized route.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Route optimization is a complex problem to be solved with several constraints, including but not limited to, customer availability, material type, right crew availability, vehicle type and its availability, and route pliability, and so on. The variation of constraints and optimization parameter for each business, and dynamic nature of execution makes it challenging to optimize routes for fleet in real-time. Herein, 'fleet' refers to group of vehicles, more particularly commercial vehicles that can be utilized for logistic purposes.

During transport of fleet or freight, various uncertainties necessitates dynamic changes in the delivery sequence and/or requirements. Examples of such uncertainties include, but are not limited to, those pertaining to drivers, vehicles, customers, routes and various other constraints. Such constraints must be accommodated in fleet management systems so as to obtain a real-time visibility with operational insights that can facilitate in better planning of transport cost optimal transportation solution.

The conventional systems employed for route optimization includes static GIS maps from which routes are calculated. These maps are created before deployment of the system based on the geographical data available at that point of time. These maps remain unchanged even though new road segments are added, because of which the optimized routes are created with old data only.

However, such conventional systems suffer from various limitations. For example, the conventional fleet optimization systems consider either distance or time, i.e. such systems create optimized routes by taking distance or time as a input parameter which gives inaccurate output. In other systems, mostly GIS related constraints are taken care of, but constraints like vehicle capacity, vehicle type (hazardous, non-hazardous, inflammable), vehicle travel distance/duration per day, parcel capacity, parcel type etc. are not considered.

Various embodiments disclosed herein provides method and system for fleet route optimization which is more optimal as compared to the conventional scenarios where the distance and time are considered separately. For example, in an embodiment, the disclosed system determines optimized routes by considering distance and time, and utilizes the same to compute a weightage matrix prior to initiating route optimization. The weightage matrix is dynamically update for each planning instance based on a historical data and previous instance's data. Herein, the previous instance may be a previous day's instance or a previous trip's instance taken on the same day.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 5, where similar reference characters denote corresponding features consistently throughout the figures, there are shown preferred embodiments and these embodiments are described in the context of the following exemplary system and/or method.

Figure 1:
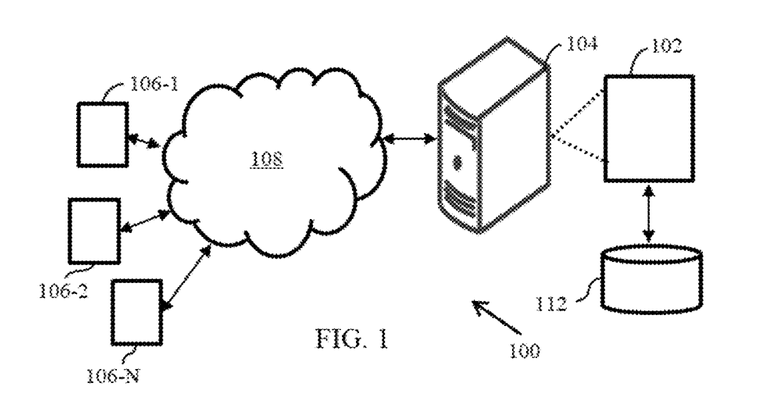
FIG. 1 illustrates an example network implementation of a system for fleet route optimization in accordance with an example embodiment.

FIG. 1 illustrates an example network implementation 100 of a system 102 for fleet route optimization in accordance with an example embodiment. In an embodiment, the system 102 facilitates route optimization for routes by fleet and thus providing a technical solution of route optimization. In an embodiment, the disclosed system 102 splits target data associated with target locations into multiple clusters based on distance from a target location. The system applies a heuristic model to each of clusters for calculating initial routes using a weightage matrix which is computed based on relative distances, time, and opportunity cost or lost value associated with multiple target locations. The system 102 then applies route optimization among the routes considering capacity of the vehicle and total route distance.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2:
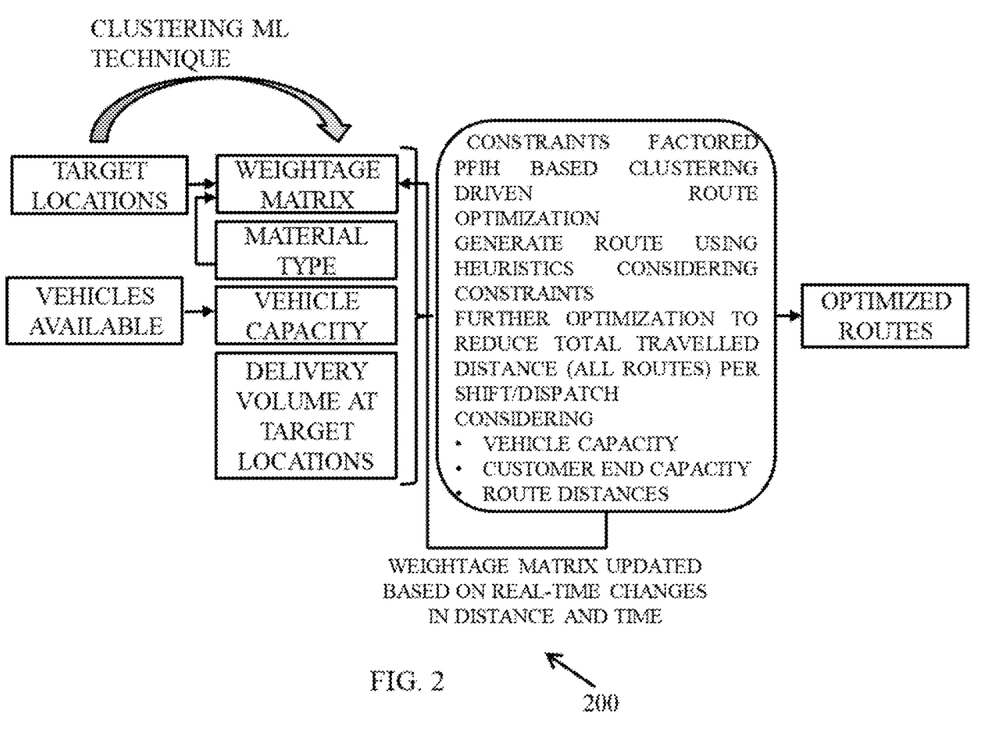
FIG. 2 is a process flow diagram of a method for fleet route optimization according to some embodiments of the present disclosure.

FIG. 2 illustrates a high-level process flow diagram for a method for fleet route optimization in accordance with an example embodiment. Fleet route optimization is a complex problem to be solved with several constraints like customer availability, material type, right crew availability, vehicle type and its availability, and route pliability, and so on. The variation of constraints and optimization parameter for multiple distinct scenarios and dynamic nature of execution requires use of techniques for optimization. Disclosed fleet route optimization method and system accommodates dynamic changes in constraints related to driver, vehicle, customer, route and other constraints, and provide cost optimal transportation solution. The fleet route optimization includes identifying routes with optimized distances or travel times after applying constraints, given the vehicles, the delivery/pickup customer locations and other constraints. Based on specific constraints, the disclosed system can create routes dynamically, monitor it through the application, and dynamically change/alter the routes based on new order/execution challenges A set of constraints employed for performing fleet route optimization in accordance with various embodiments includes, for example, target location constraint and vehicle constraint. The target constraint includes but are not limited to, material weight, material type (hazardous/non-hazardous/inflammable), delivery time window, vehicle type allowed at target location (Low/Medium/High), delivery and/or pickup, allowed/avoid customer sequence order, target location priority, and pliability of routes, and so on. The vehicle constraints may include but are not limited to maximum travel time for a day, max travel distance for a day, vehicle type (Low/Medium/High), vehicle material type (hazardous/non-hazardous/inflammable), current vehicle location, road type (one way, toll road, 2-lane, 4-lane and so on), turning radius at sharp turns on the road.

As illustrated in FIG. 2, the method for fleet route optimization includes determining target locations 202 and vehicles available 204 for fulfilling requests at the target locations. The target locations are clustered by using a machine learning based approach into multiple clusters. A distance matrix is computed at 206 using the relative distance between target locations in each of the clusters and material type/quantity to be delivered/picked-up from each of the target locations. Herein, it will be understood that the distance matrix is updated based on real-time route changes for distance and time, as will be explained later in the description. At 208, the available vehicle information 204 is utilized to derive vehicle capacity required in a given scenario (or a day). The disclosed fleet route optimization at 210 employs heuristics and clustering techniques tuned for reduced computational response times considering capacity and route distances to arrive at optimized routes at 212, as will be described further in detail with reference to FIG. 3.

Figure 3:
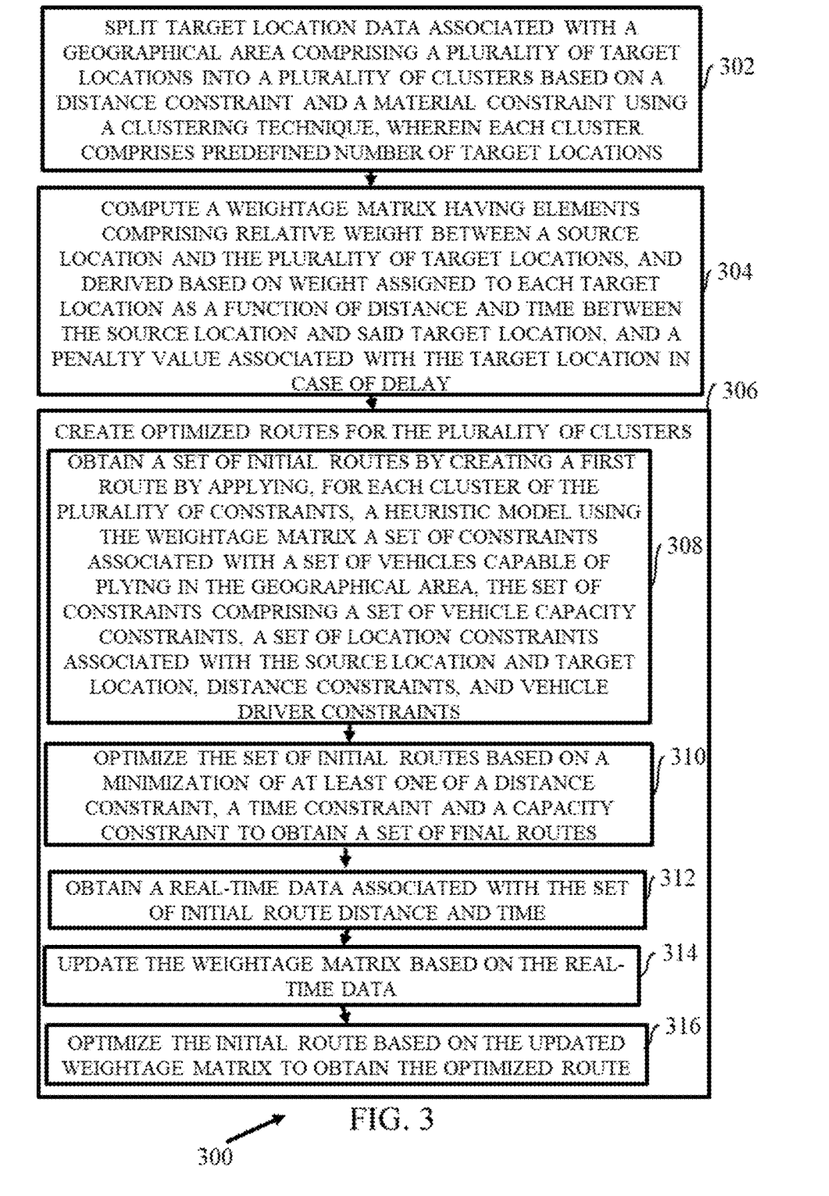
FIG. 3 is a flow diagram of a method for fleet route optimization according to some embodiments of the present disclosure.

FIG. 3 illustrates a flow diagram of a method 300 for fleet route optimization in accordance with an example embodiment. The method 300 depicted in the flow chart is executed by a system, for example, the system 102 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 102. However, the operations of the method 200 can be described and/or practiced by using any other system.

The disclosed method is related to vehicle routing problem and more related to optimizing the vehicle routes carrying the goods (logistics) of scattered customers for pickup and delivery, as will be described in detail below.

The disclosed embodiments consider multiple route points in a geographical area. Said route points may be pick-up points or drop points in a route which is traversed by a vehicle. For example, while routing a vehicle from a source location, i.e. a warehouse, the vehicle covers multiple drop points and pickup points till the vehicle capacity is reached. If the vehicle starts from a different location other than a warehouse, the covers the pickup locations only. Such drop points and the pick-up points encountered by the vehicle during its round trip may hereinafter be referred to as 'target locations'.

As a first step, prior to initiating routing of vehicles, a target location data comprising the number of target locations and the number of vehicles available for a geographical area are obtained. Additionally, a distance constraint and a material constraint may be identified for the plurality of target locations and the number of vehicles. The distance constraint refers to the relative distances between the target locations amongst themselves and distance between each of the target location and the source location. The material constraint refers to, for example, type of material, quantity of material and so on for the material that is to be transported in the vehicle fleet.

At 302, the target location data is split into a plurality of clusters based on a distance constraint and a material constraint using a clustering technique. If the number of target locations are greater than a predefined threshold number of target locations, then the number of target locations are split into a plurality of clusters. In an embodiment, if the target location capacity is more than the capacity of vehicles, then the total target capacity is split into vehicle's capacity multiples. In this case, a single customer may be considered as multiple number of customers at same location. In an embodiment, k-means clustering technique may be applied to divide the data set into evenly divided clusters of different sizes.

At 304, a weightage matrix is computed such that the elements of the weightage matrix includes relative weight between a source location and the plurality of target locations in the geographical area. The elements of the weightage matrix are derived based on weight assigned to each target location as a function of distance and time between the source location and said target location, and a penalty value associated with the target location in case of delay. For example, each element of the weightage matrix is determined as an element having minimum value between all $W_{ij}$ between a source location $i$ and target location $j$, wherein $W_{ij}$ is the weightage which is the function of distance, time and value loss, and wherein $W_{ij}$=(cost per one km travel*distance between source $i$ and destination $j$)+(cost of vehicle per hour*traveling time in hours between source $i$ and destination $j$)+(cost of loss of value for destination $j$ customer per hour due to delivery delay).

Herein, it will be note that the weightage matrix may be different for each vehicle as each vehicle is associated with a different cost/kilometer and cost/hour. In order to accommodate pliability including turning radius requirements of the route, the road segment points and the road type are considered in finalizing the route between two target locations. Based on the finalized route, the distance is calculated and is placed in the matrix say at index[A][B]. The conditions used for pliability checks that the road width is more than the vehicle width [part of vehicle model technical specification and the arc radius at any given three points of a route segment should be greater than or equal to vehicle's turning radius [part of vehicle model technical specification].

At 306, optimized routes for each cluster of the plurality of clusters are created. The method for creating an optimized route for a cluster of the plurality of clusters is described with reference to 308-314. In an embodiment, creating an optimized route for a clusters from amongst the plurality of clusters comprises obtaining, at 308, a set of initial routes by creating a first route by applying, for each cluster of the plurality of constraints, a heuristic model using the weightage matrix a set of constraints associated with a set of vehicles capable of plying in the geographical area. The set of constraints includes a set of vehicle capacity constraints, a set of location constraints associated with the source location and target location, distance constraints, and vehicle driver constraints.

In an embodiment, the heuristic model is Push forward insertion heuristic (PFIH) model. PFIH is used to create the routes if the distances between the target locations are available. In an embodiment said distances are the calculated weights among the target locations as explained above. Said distances may further be represented in terms of a matrix.

In an embodiment, a function for calculating initial routes and the set of constraints may be represented mathematically as below:

$$\text{Min } \Sigma_{i=0}^{n}\Sigma_{j=0}^{n}\Sigma_{k=1}^{m}w_{ij}b_{ij}^{k} \quad (1)$$

where, $w_{ij}$ is weight between a source location i and a target location j $b_{ij}=1$ when target location j served after target location i $=0$ when target location j not served after target location i $b_j^k$ fraction of capacity for $i^{th}$ target location capacity carried by a vehicle $C_i$—$i^{th}$ volume requirement or pickup/delivery demand to be met at a target location $V_k$—$k^{th}$ vehicle capacity n—Total number of customers m—Total number of vehicles Constraints:

All target locations should be allocated:

$$\Sigma_{i=0}^{n}\Sigma_{j=0}^{n}\Sigma_{k=1}^{m}b_{ij}^{k}=1 \quad (2)$$

Total target locations volume requirement should be allocated:

$$\Sigma_{k=1}^{m}f_i^k=C_i \text{ for all target locations}$$

Total vehicle capacity should not be exceeded.

$$\Sigma_{i=0}^{n}f_i^k=V_c \text{ for all vehicles of the fleet}$$

Figure 4A:
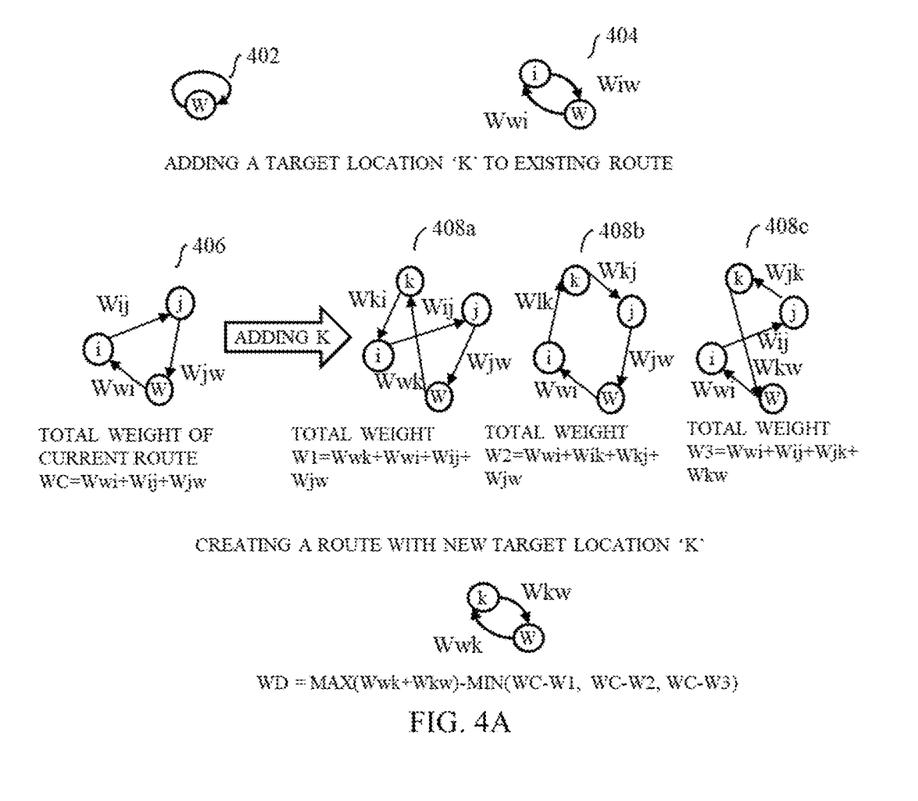
FIG. 4A illustrates an example of creation of an initial route for fleet route optimization according to an embodiment of the present disclosure.

An example of creation of the initial route is illustrated in FIG. 4A.

As an example, referring to FIG. 4A, an initial route is created using the PFIH model by selecting a vehicle from amongst the set of vehicles that satisfies a travel distance and travel time criteria associated with the set of constraints. The distance constraint may be represented in form of a square weightage matrix. A weightage matrix is created as applicable for the vehicle. Thereafter, a route 402 is created with source location (e.g. a warehouse (w)) as staring point and ending point, as illustrated in FIG. 4A. A highest weightage target location is selected based on a weightage which is a function of distance, time, and value loss from the source location (e.g. warehouse w) and is assigned to a current route of 404. Next, another target location is selected at 406, and a best position in the route delivery sequence is determined based on the target location which gives least weightage, e.g. traveling distance 'lw' when added to an existing route. Then the round-trip weightage e.g. traveling distance 'rw' of that target location from the source location is determined. The same process is repeated for all unassigned target locations at 408a, 408b, 408c and so on. Thereafter, a target location and its position are identified in route delivery sequence which gives WD as max 'rw'−'lw'. That target location may be assigned to route created at 402. While assigning a target location, all the constraints related to target location and vehicle may be considered. The final route with a new target location 'k' is as below:

$$W_D=\text{Max}((Wwk+Wkw)-\min(W_1-W_c, W_2-W_c, W_3-W_c))$$

An example of adding target locations to a route is illustrated with reference to FIG. 4B.

Figure 4B:
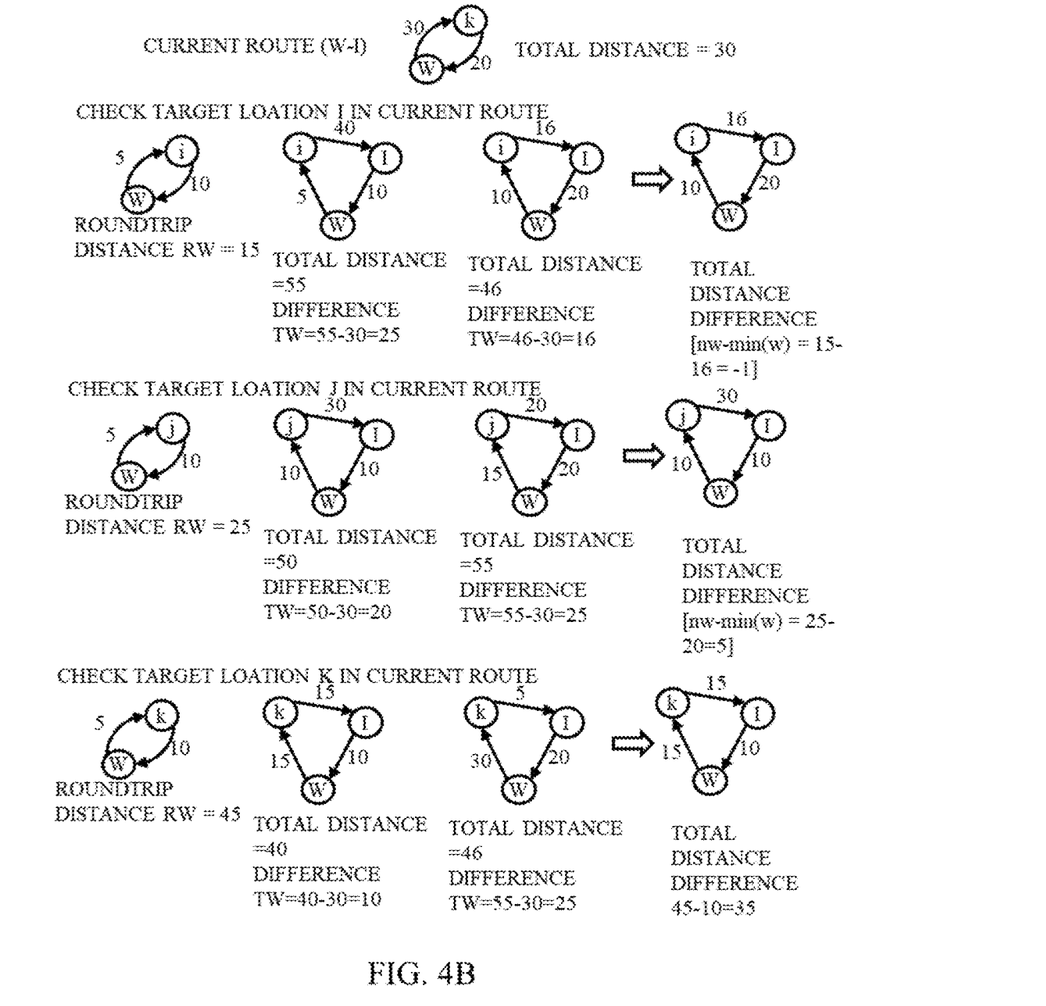
FIG. 4B illustrates an example of adding target locations to a route for fleet route optimization according to an embodiment of the present disclosure.

Referring to FIG. 4B, the current route (W−l) is shown as 432. The total distance of current route 432 is 30. Various other routes are shown on addition of target locations in the current route such as target location i, j, k, and l, to obtain a round trip distance. The weightage matrix for the aforementioned scenario is shown as:

$$\begin{array}{c c c c c c} & w & i & j & k & l \\ w & 0 & 5 & 10 & 15 & 20 \\ i & 10 & 0 & 20 & 30 & 40 \\ j & 15 & 10 & 0 & 25 & 30 \\ k & 30 & 5 & 10 & 0 & 15 \\ l & 10 & 16 & 20 & 5 & 0 \end{array}$$

First W−W(0) is checked.

Then, W−l(20)−w(10) is determined to be 30. l(20) indicates the weight from previous stop till current stop I.

Check Customer i in Current Route

Round trip of I: w-i(5)-w(10) → Round Trip distance = 15 a. W-i(5)-I(40)-w(10) → Total distance = 55 → 55−30 = 25   } 15-min (25, 16) = −1(<0) not considered b. W-I(20)-i(16)-w(10) → Total distance = 46 → 46−30 = 16

Check Customer j in Current Route

Round trip of j: w-j(10)-w(15) → Round Trip distance = 25
W-i(5)-I(40)-w(10) → Total distance = 50 → 50−30 = 20   } 25-min (20, 25) = 5
W-I(20)-j(20)-w(15) → Total distance = 55 → 55−30 = 25
Round trip of k: w-i(5)-w(10) → Round Trip distance = 45                               } Max(5, 35)
W-k(15)-I(15)-w(10) → Total distance = 40 → 40−30 = 10   } 45-min (10, 25) = 35
W-I(20)-k(5)-w(30) → Total distance = 55 → 55−30 = 25

Max(5, 35)=35 is by inserting k in existing route (W–I–W). The route after inserting k is w-k-I-w.

While attaching a customer to route, all vehicle and customer constraints like material type, vehicle type allowed at customer location, vehicle traveling distance and time and delivery/pickup time window need to be checked and satisfied. The process is repeated till vehicle capacity or traveling distance or traveling time are exhausted. The aforementioned steps of 402-408c are repeated till all target locations are assigned.

It will be noted that the aforementioned method is applicable for determining outbound routes as well as inbound routes. The outbound routes starts from warehouse covering customer delivery and pickup locations and returning back to warehouse. The inbound routes on the other hand covers the vehicles which starts from different locations to warehouse. The outbound routes as well as the inbound routes can be generated by using PFIH as explained above. For example, for outbound routes, while attaching a customer to route, all vehicle and customer constraints like material type, vehicle type allowed at customer location, vehicle traveling distance and time and delivery/pickup time window need to be checked and satisfied. When there is a need to cover all the target locations in a specific geographical area in optimized sequence, the following method is adopted. First all customers in the zone are routed then this sub route is considered as a single customer with its own distance and time. While creating a route with PFIH, whenever sub-route is included, the distance and time of the sub-route is considered for total distance and time calculations of the route.

For inbound routes, steps are same as above but when a vehicle is selected it should be checked whether it starts from warehouse or not. If it starts from a location other than warehouse, a route is created with current vehicle location as a start point and warehouse as an endpoint. Rest of the process remain same.

In an embodiment, while applying heuristic for inbound and outbound routes, if the capacity of all vehicles are same (means same vehicle type), created route distances depends on vehicle chosen order. This means, if the chosen order of vehicle types is changed (among high, medium, low capacity) for a route creation, a different set of routes with varying total distance/routes may get created.

So, to optimize the total number of vehicles utilization and total traveled distance/time, next level optimization is applied across previously optimized routes, as explained below, for predefined number of iterations or till convergence of distance/time. Accordingly, at 310, the set of initial routes are optimized based on a minimization of at least one of a distance constraint, a time constraint and a capacity constraint to obtain the set of final routes. For example, if any of the vehicle carrying less than fifty percent of its capacity, then vehicle is released and its target locations are assigned to other routes using PFIH technique. For any two vehicles of different capacity types which are carrying less than its capacity, the PFIH technique is applied on vehicles in reverse order. Additionally or alternatively, the customers which are apart by less than some predefined distance between two routes are interchanged. An example of route optimization (based on distances and based on time) are illustrated with reference to FIGS. 4C and 4D.

Figure 4C:
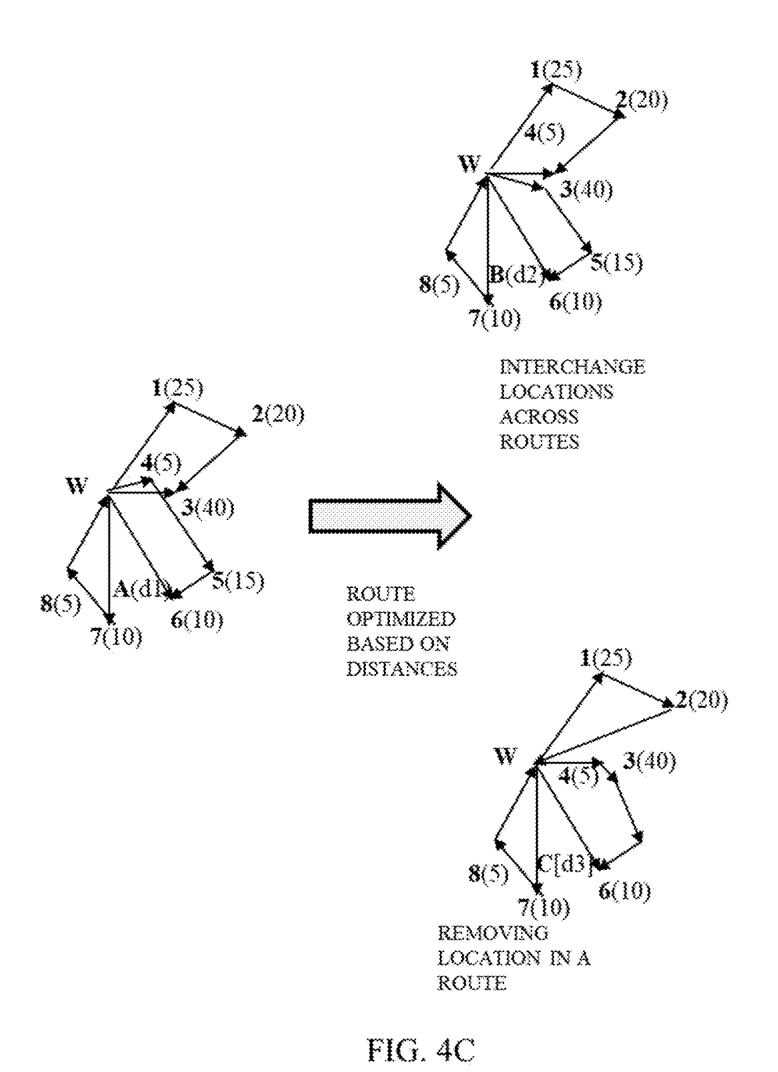
FIG. 4C illustrates an example of fleet route optimization based on distances according to an embodiment of the present disclosure.

Initial routes in A: w–1–2–3–w, w–4–5–6–w. Initial total distance d1. Vehicle capacity (in braces), w-warehouse.

Method 1—After interchange of location 3 and 4, routes in B are: w–1–2–4–w, w–3–5–6–w. Revised total distance is d2.

Method 2—After removing location 3, modified routes: w–1–2–w, w–4–3–5–6–w. Revised total distance is d3.

Select the route with least distance among d2, d3 and repeat for all routes obtained after initial optimization using PFIH and clustering.

Referring to FIG. 4C, an example of optimization based on distances is described. Herein, initial routes in A: w–1–2–3–w, w–4–5–6–w. Initial total distance d1. Vehicle capacity is shown in braces. w is the warehouse.

Method 1-After interchange of location 3 and 4, routes in B are: w–1–2–4–w, w–3–5–6–w. Revised total distance d2.

Method 2: After removing location 3, modified routes: w–1–2–w, w–4–3–5–6–w. Revised total distance d3.

The route with least distance among d2, d3 is selected. The aforementioned steps are repeated for all the first set of routes obtained after initial optimization using PFIH and clustering.

Figure 4D:
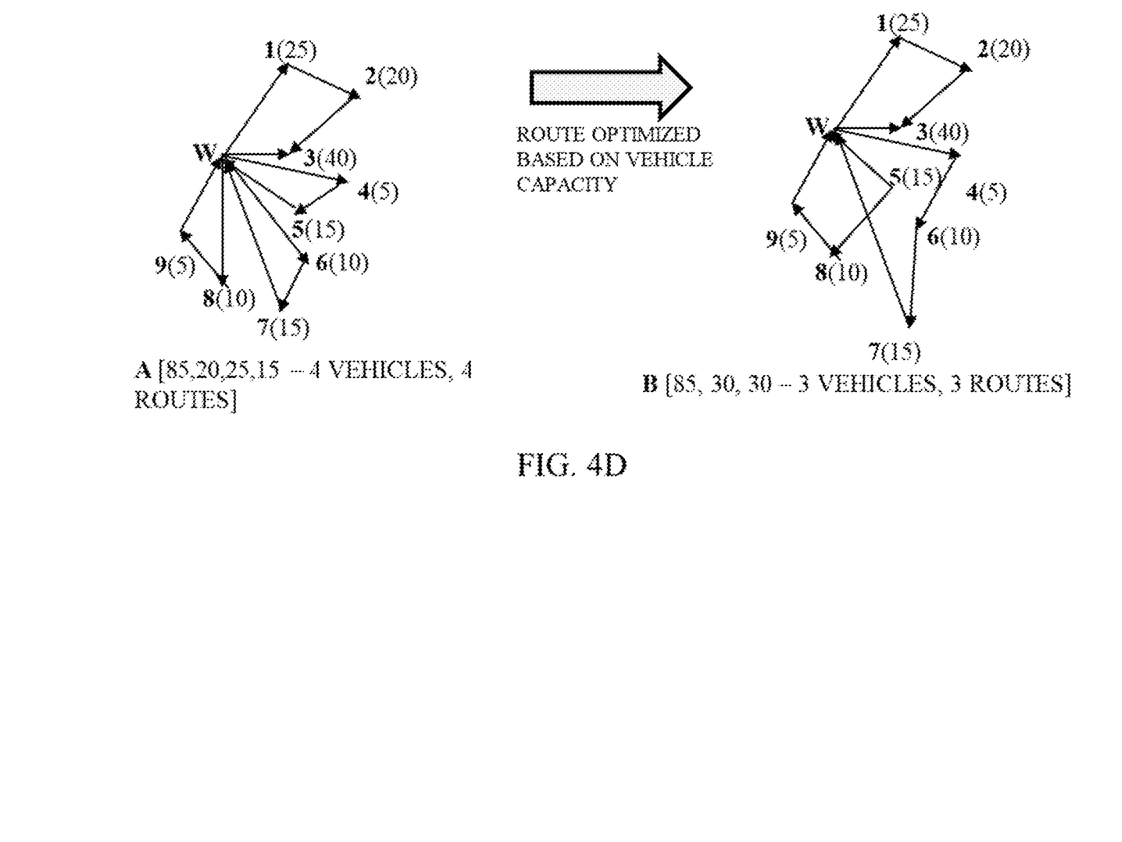
FIG. 4D illustrates an example of fleet route optimization based on vehicle capacity according to an embodiment of the present disclosure.

Referring to FIG. 4D, an example of optimization based on vehicle capacity is illustrated. Herein, initial routes in A: w–1–2–3–w, w–4–5–w, w–6–7–w, w–8–9–w. Initial capacities route wise are 85, 20, 25, 15. Using 4 vehicles, 4 routes, vehicle capacity shown in FIG. 4D.

After optimization, routes are (in B): w–1–2–3–w, w–4–67–w, w–5–8–9–w. Route-wise capacities are 85, 30, 30.

Using 3 vehicles, 3 routes. The aforementioned process is repeated for all routes obtained after initial optimization using PFIH and clustering.

At 312, the method 300 includes obtaining a real-time data associated with the set of initial route distance and time based on the initial set of routes followed by the vehicles in real-time. In an embodiment, the real-time data may be obtained from the vehicles plying on the set of initial routes computed using PFIH. In an embodiment, the real-time data may be obtained using known techniques such as Onboard GPS devices, real-time data from mobile applications such as driver mobile real-time location, and so on. In some scenarios the mobile having mobile application may be fastened to the vehicle and cannot be dislodged. The real-time data includes the distance and the time associated with the source location and the target locations. At 414, the weightage matrix is updated based on the real-time data.

At 316, the final routes are optimized based on the updated weightage matrix to obtain the optimized route for a subsequent trip.

Figure 5:
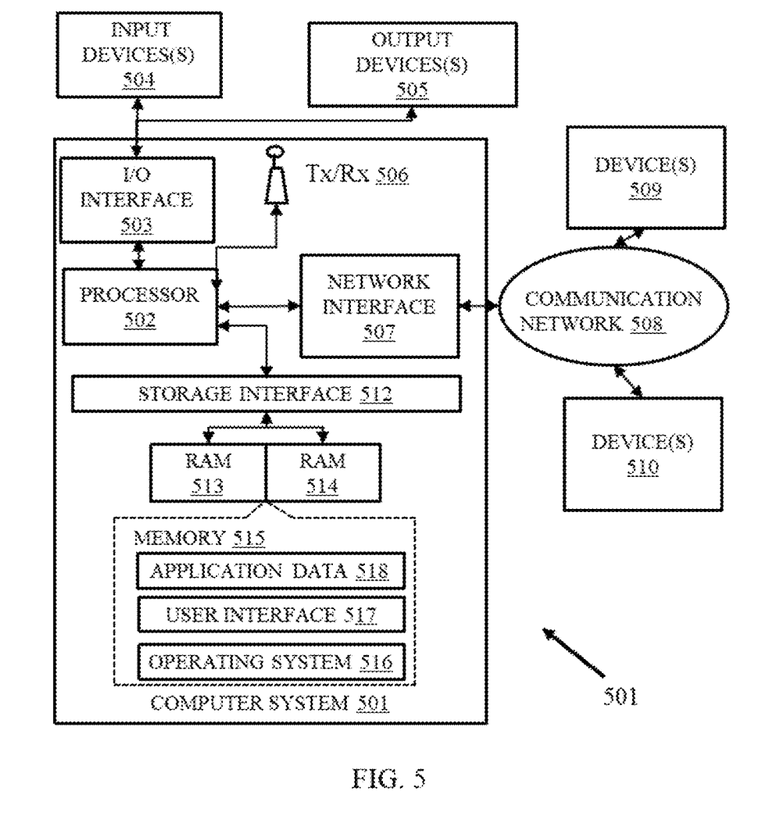
FIG. 5 is a block diagram of an exemplary computer system for implementing embodiments consistent with the present disclosure.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 502 may be a multi-core multi-threaded processor.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 516, user interface application 517, user/application data 518 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides system and method for fleet route optimization. The disclosed method includes optimization at two levels. At the first level, an initial optimized route is obtained for the fleet by clustering the target locations into multiple clusters and obtaining heuristic on each cluster by using a weightage matrix. The initial set of optimized routes are examined in real time, and based on said examination, the routes are optimized (second level optimization) to provide a final set of optimized routes. The disclosed method and system thus facilitate in creating routes dynamically, monitor it through the application, and dynamically change/alter the routes based on new order/execution challenges. Due to the use of weightage matrix for computation of optimized routes, the disclosed method and system provides a real-time fleet optimization solution by considering vehicle capacity, travelling distance for creating final routes from initial routes which are created by using heuristic. With the disclosed approach, multiple iterations are reduced by combining all factors into a function of distance, duration and value. The weightage matrix is computed by utilizing distance, duration, and cost of loss to customer (by not delivering or due to delay in delivery).

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for fleet route optimization comprising:
    splitting, via one or more hardware processors, a target location data associated with a geographical area comprising a plurality of target locations into a plurality of clusters based on a distance constraint and a material constraint using a clustering technique, wherein each cluster comprises predefined number of target locations;
    computing a weightage matrix via the one or more hardware processors, wherein elements of the weightage matrix comprises relative weights between a source location and the plurality of target locations in the geographical area, wherein the elements of the weightage matrix are derived based on a weight assigned to each target location as a function of distance and time between the source location and said target location, and a penalty value associated with the target location in case of delay, wherein the weight matrix is dynamically updated for each planning instance based on historical data and previous instance data, wherein the previous instance data is a previous day's instance or a previous trip's instance taken on a same day; and
    creating, via the one or more hardware processors, optimized routes for the plurality of clusters, wherein the creation of optimized routes are enabled by monitoring through an application and dynamically change or alter the routes based on new order or execution challenges, wherein creating an optimized route for a cluster from amongst the plurality of clusters comprises:
        obtaining a set of initial routes by applying, for each cluster of the plurality of clusters, a heuristic model using the weightage matrix and a set of constraints associated with a set of vehicles, the set of constraints comprising a set of vehicle capacity constraints, a set of location constraints associated with the source location and target location, the distance constraint, and vehicle driver constraints;
        optimizing the set of initial routes based on a minimization of at least one of the distance constraint, a time constraint and the set of vehicle capacity constraints to obtain a set of final routes;
        obtaining a real-time data associated with distance and time based on the set of initial routes followed by the vehicles in real-time, the real-time data comprising the distance and the time associated with the source location and the target locations;
        updating the weightage matrix based on the real-time data; and
        optimizing the set of final routes based on the updated weightage matrix to obtain the optimized route, wherein the fleet route optimization employs heuristics and the clustering technique tuned for reduced computational response times considering capacity and route distances to arrive at the optimized route.

2. The processor implemented method of claim 1, wherein each element of the weightage matrix is determined as an element having minimum value from amongst $W_{ij}$ between a source i and destination j, wherein $W_{ij}$ is the weightage which is the function of the distance, the time and a value loss, and wherein $W_{ij}$=(cost per one km of travel*distance in kilometres between source i and destination j)+(cost of vehicle per hour in traveling time in hours between source i and destination j)+(cost of loss of value for customer per hour due to delivery delay).

3. The processor implemented method of claim 1, wherein the heuristic model is Push forward insertion heuristic (PFIH) model.

4. The processor implemented method of claim 1, wherein the set of initial routes, is optimized based on one or more constraints associated with the set of vehicles, the one or more constraints comprising the capacity constraints, and the distance constraint.

5. The processor implemented method of claim 1, further comprising:
    determining whether a number of target locations in the set of target locations is greater than or equal to a predetermined threshold of the number of target locations; and
    on determination of the number of target locations in the set of target locations is greater than or equal to a predetermined threshold, splitting data associated with the set of target locations into a plurality of clusters based on the distance constraint and a material constraint, wherein each cluster comprises predefined number of target locations using k-means clustering.

6. A system for fleet route optimization comprising:
    a memory storing instructions;
    one or more communication interfaces; and
    one or more hardware processors coupled to the memory via the one or more communication interfaces, wherein the one or more hardware processors are configured by the instructions to:
        split target location data associated with a geographical area comprising a plurality of target locations into a plurality of clusters based on a distance constraint and a material constraint using a clustering technique, wherein each cluster comprises predefined number of target locations;
        compute a weightage matrix, wherein elements of the weightage matrix comprises relative weight between a source location and the plurality of target locations in the geographical area, wherein the elements of the weightage matrix are derived based on a weight assigned to each target location as a function of distance and time between the source location and said target location, and a penalty value associated with the target location in case of delay, wherein the weight matrix is dynamically updated for each planning instance based on historical data and previous instance data, wherein the previous instance data is a previous day's instance or a previous trip's instance taken on a same day; and
        create optimized routes for the plurality of clusters, wherein to create an optimized route for a cluster from amongst the plurality of clusters, wherein the creation of optimized routes are enabled by monitoring through an application and dynamically change or alter the routes based on new order or execution challenges, the one or more hardware processors are configured by the instructions to:
            obtain a set of initial routes by applying, for each cluster of the plurality of clusters, a heuristic model using the weightage matrix and a set of constraints associated with a set of vehicles, the set of constraints comprising a set of vehicle capacity constraints, a set of location constraints associated with the source location and target location, the distance constraint, and vehicle driver constraints;

optimize the set of initial routes based on a minimization of at least one of the distance constraint, a time constraint and the set of vehicle capacity constraints to obtain a set of final routes;

obtain a real-time data associated with distance and time based on the set of initial routes followed by the vehicles in real-time, the real-time data comprising the distance and the time associated with the source location and the target locations;

update the weightage matrix based on the real-time data; and optimize the set of final routes based on the updated weightage matrix to obtain the optimized route, wherein the fleet route optimization employs heuristics and the clustering technique tuned for reduced computational response times considering capacity and route distances to arrive at the optimized route.

7. The system of claim 6, wherein each element of the weightage matrix is determined as an element having minimum value between all $W_{ij}$ between a source i and destination j, wherein $W_{ij}$ is the weightage which is the function of distance, time and value loss, and wherein $W_{ij}$=(cost per one km of travel*distance in kilometres between source $i$ and destination $j$)+(cost of vehicle per hour in traveling time in hours between source $i$ and destination $j$)+(cost of loss of value for customer per hour due to delivery delay).

8. The system of claim 6, wherein the heuristic model is Push forward insertion heuristic (PFIH) model.

9. The system of claim 6, wherein the set of initial routes is optimized based on one or more constraints associated with the set of vehicles, the one or more constraints comprising the capacity constraints, and the distance constraint.

10. The system of claim 6, wherein the one or more hardware processors are further configured by the instruction to:

determine whether a number of target locations in the set of target locations is greater than or equal to a predetermined threshold of the number of target locations; and on determination of the number of target locations in the set of target locations is greater than or equal to a predetermined threshold, split data associated with the set of target locations into a plurality of clusters based on the distance constraint and a material constraint, wherein each cluster comprises predefined number of target locations using k-means clustering.

11. A computer program product comprising a non-transitory computer readable medium having a computer readable program embodied therein, wherein the computer readable program, when executed on a computing device, causes the computing device to:

split target location data associated with a geographical area comprising a plurality of target locations into a plurality of clusters based on a distance constraint and a material constraint using a clustering technique, wherein each cluster comprises predefined number of target locations;

compute a weightage matrix, wherein elements of the weightage matrix comprises relative weight between a source location and the plurality of target locations in the geographical area, wherein the elements of the weightage matrix are derived based on a weight assigned to each target location as a function of distance and time between the source location and said target location, and a penalty value associated with the target location in case of delay, wherein the weight matrix is dynamically updated for each planning instance based on historical data and previous instance data, wherein the previous instance data is a previous day's instance or a previous trip's instance taken on a same day; and create optimized routes for the plurality of clusters, wherein to create an optimized route for a cluster from amongst the plurality of clusters, wherein the creation of optimized routes are enabled by monitoring through an application and dynamically change or alter the routes based on new order or execution challenges, the one or more hardware processors are configured by the instructions to:

obtain a set of initial routes by applying, for each cluster of the plurality of clusters, a heuristic model using the weightage matrix and a set of constraints associated with a set of vehicles, the set of constraints comprising a set of vehicle capacity constraints, a set of location constraints associated with the source location and target location, the distance constraint, and vehicle driver constraints;

optimize the set of initial routes based on a minimization of at least one of the distance constraint, a time constraint and the set of vehicle capacity constraints to obtain a set of final routes;

obtain a real-time data associated with distance and time based on the set of initial routes followed by the vehicles in real-time, the real-time data comprising the distance and the time associated with the source location and the target locations;

update the weightage matrix based on the real-time data; and optimize the set of final routes based on the updated weightage matrix to obtain the optimized route, wherein the fleet route optimization employs heuristics and the clustering technique tuned for reduced computational response times considering capacity and route distances to arrive at the optimized route.

* * * * *